Nov. 18, 1952     C. DE BRABANDER     2,618,395
STORAGE BIN CONTROL
Filed Nov. 16, 1948
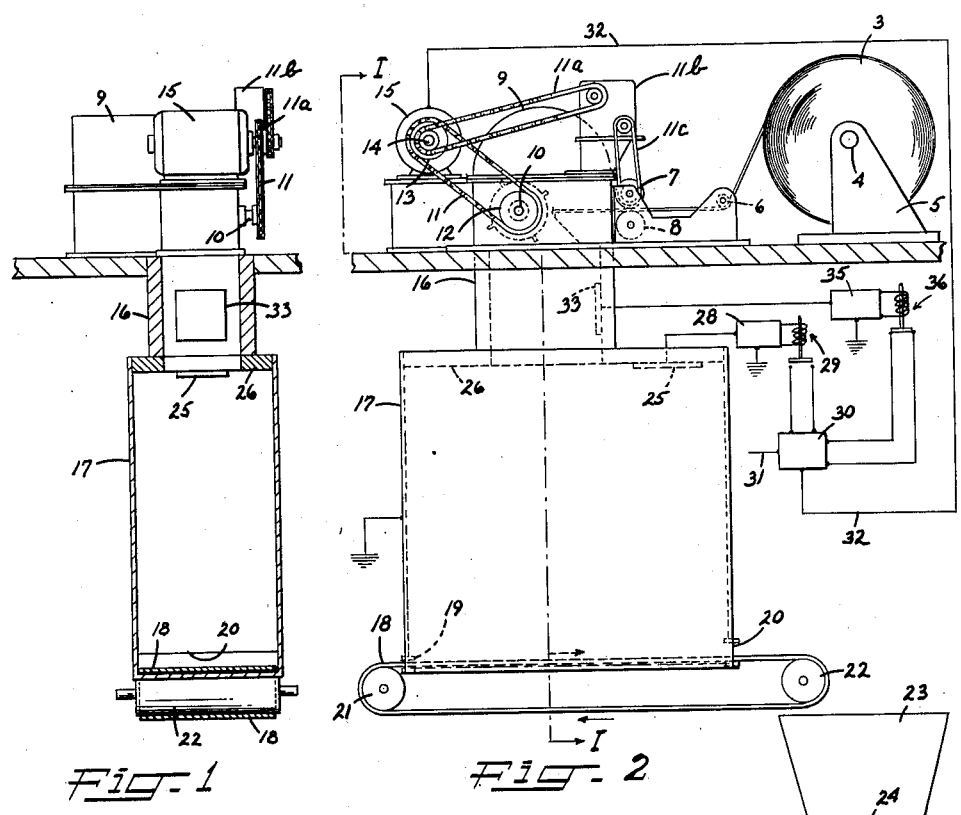
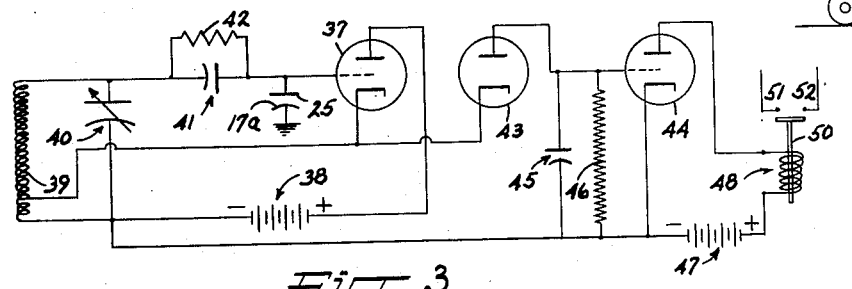
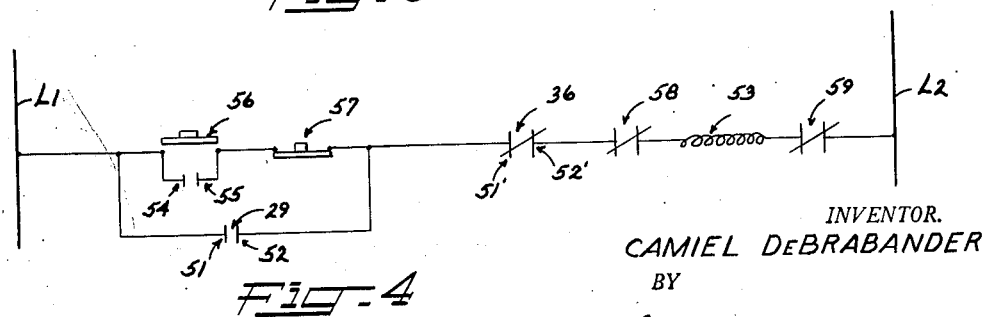
INVENTOR.
CAMIEL DeBRABANDER
BY
Thomas R. Nally Patented Nov. 18, 1952

2,618,395

UNITED STATES PATENT OFFICE 2,618,395

STORAGE BIN CONTROL

Camiel de Brabander, Newport, Del., assignor to American Viscose Corporation, Wilmington, Del., a corporation of Delaware Application November 16, 1948, Serial No. 60,375

5 Claims. (Cl. 214—17)

This invention relates to an apparatus for controlling the feed to a storage bin so as to prevent overflow and also to prevent the reduction of the contents of the bin to too low a level therein.

In various industrial practices, it is necessary to withdraw the material at intervals from a storage bin containing the material. When the withdrawal is effected at intervals, such as when the material is taken out batch by batch for subsequent processing, it is difficult to synchronize any system for feeding the material to ensure that there is always adequate material within for the next batch but at the same time there is no danger of overflowing when the frequency of withdrawal of the batches may be temporarily reduced because of maintenance of such systems, such as cleaning, overhaul requirements, etc., of the equipment used for subsequent processing. Furthermore, the feeding equipment may perform some specific work upon the material as it is fed to the storage bin and if the material in the bin should pile up or should be backed up in the feeding machine, this machine may be damaged seriously. It is, therefore, an object of this invention to devise a system for automatically detecting the attainment of a predetermined low level in the bin and also the attainment of two holding positions and for controlling the feed mechanism accordingly. Thus, when the level falls to the low point, the feeding mechanism will be restarted automatically by the detecting system, whereas when the bin becomes too full, the detecting mechanism will stop the system, thereby preventing overflow and any damage to the feeding mechanism. It is a particular object to provide a system that is capable of reliably detecting the building up of excessively high piles of extremely light and fluffy fibrous materials, such as shredded wood pulp, which because of lightness and irregularity in piling, are incapable of operating a mechanical switch for an electrical circuit. Other objects and advantages of the invention will be apparent from the drawing and the description thereof, hereinafter.

In the drawing, which is illustrative of the invention,

Figure 1 is a sectional elevation on line I—I of Figure 2,

Figure 2 is a front end elevation of the embodiment of Figure 1,

Figure 3 illustrates one electronic circuit adapted for the system, and

Figure 4 is the elementary diagram of the motor control circuit.

The specific application of the invention shown in Figures 1 to 4 of the drawing is concerned with a storage bin adapted to receive a finely divided material which is fed to a shredder at the top of the bin in the form of a continuous sheet. At intervals individual batches are withdrawn from the bottom of the bin by means of a continuous belt which rides over the floor of the bin and thus itself constitutes a supporting surface for the material contained in the bin. Thus, the material may be a fibrous sheet of wood pulp, paper pulp, cotton, cotton linters, or the like, and the bin may store the shredded material until it is to be withdrawn for transfer to acetylators, xanthators, or the like. It is to be understood, however, that the invention is not restricted to operation upon fibrous material; nor restricted to the handling of materials which are to be subjected to chemical reactions necessarily. The storing of any particular material in the bin may be for any purpose whatsoever, and the batch discharged from the bin may proceed to any point for any purpose whatsoever, such as chemical reaction, packaging, or the like.

In Figures 1 and 2, a wound roll 3 of a continuous sheet of cellulosic fibrous material is rotatably supported upon a shaft 4 in suitable brackets 5. The sheet passes under a transverse guiding rod 6 into the nip between the pair of rolls 7 and 8 which serve to feed the material into a shredder in the housing 9. The shredder may simply constitute a rotating knife reel operated in tangential relationship with a fixed anvil over which the sheet is fed by the rolls. The rotating cutter reel carried on the shaft 10 is driven by a chain 11 and sprockets 12 and 13, 12 being secured at the end of shaft 10 and 13 being secured to the shaft 14 of a driving motor 15. The chain 11a is also driven by the motor 15 and drives a gear box 11b which in turn through a chain 11c drives one of the rolls 7 and 8. The other may be driven from the first roll by suitable gearing so that they will rotate in opposite directions. The cut clumps of fibers are thrown downwardly through the chute or duct 16 into the bin 17 over the floor of which the upper course of a belt 18 rides. A narrow slot 19 is provided to allow entrance of the belt at the back of the bin and a comparatively large opening at the front allows the belt to emerge with a thick layer of the material thereon. The belt may be driven by a pair of rolls 21 and 22 and any suitable receptacle may be disposed to receive the material which also drops from the end of the belt 18 and passes over drum 22. As shown, a container 23 on a truck 24 serves this purpose. Frequently, an automatic weighing system may be found desirable at this point. Instead of a container 23, a chute may serve to direct the material discharged from the belt 18 into a separator or the like.

An electrode, condenser plate or equivalent element 25 is secured within the ceiling 26 of the bin 17. The wall of the bin is electrically grounded by a line 27 and such wall is insulated from the electrode 25. This may advantageously be done by making the roof or top of the bin 26 of an insulating material. If desired, the side walls as well as the top may be insulated, and the belt 18 in such event could be made of an electrically conductive material and grounded. Electrode 25 cooperates with the wall or belt within the bin to form a capacitance in an electronic circuit, such as is shown in Figure 3. This capacitance serves to detect a low level in the bin and is connected by an electronic circuit 28 to a relay 29 in parallel with the button of the motor starter 30. These connections are shown schematically only in Figure 1 and the connection of the starter to the power cord is represented by the line 31, while the connection of the starter to the motor is shown by the line 32.

Similarly, another electrode, condenser plate or capacitance element 33 is provided on the inside surface of a wall of the chute 16. In this case, the walls are preferably of insulating material. As shown, electrode 33 is connected to an electronic circuit 35 which is in turn connected to a relay 36 which is in series in the holding circuit of the motor starter, as will be explained hereinafter.

In Figure 3, the electronic circuit, which is merely illustrative of many that could be used, comprises an oscillator tube 37, a source of potential 38, an inductance 39, a variable condenser 40, a fixed condenser 41, a resistance 42, the electrode 26 and the grounded electrode 17a. These elements feed through a rectifier tube 43 and to a system comprising an amplifier tube 44, a fixed condenser 45, a resistance 46, a source of potential 47 and the solenoid 48 of a relay comprising also a contact bar 49 carried by the core 50. Figure 3 shows a circuit for the electrode 25 which starts operation of the feed when the level in the bin becomes too low and in this case, the contact bar 49 is normally in open position but closes when the level in the bin becomes low as a result of the "triggering" action of the change in capacitance between 17a and 25 in the circuit. Referring to Figure 4, the normally disconnected terminals or contacts 51 and 52 are shown in parallel with the starter button of the motor 15. When the circuit through 51 and 52 is closed, the energization of coil 53 closes the motor starter contacts so that the circuit through motor 15 will be completed and it will start operating to feed more material into the bin.

The same electronic circuit as shown in Figure 3 may be employed for element 35 of Figure 1. Thus by changing electrode 25 to electrode 33, Figure 3 will represent the electronic circuit 35. In this case, however, the contact bar 49 of the relay is normally closed as shown at 51' and 52' of Figure 4. When the material piles up so high in the bin that it begins to stay within the space in the chute 16 adjacent the electrode 33, the electronic circuit opens the relay 36 which disrupts the circuit through the holding coil 53 (see Figure 4) which opens the sealing contacts 54 and 55. The circuit in Figure 4 shows the power lines $L^1$ and $L^2$, the starting switch 56, the stop switch 57, the overload contact 58 and overload contact 59 in modern conventional electrical symbols. It will be noted as stated above, that when the material piles up so as to clog the tube 16, the capacitance between the electrode 33 and the material piled above the grounded container 17 sets off the electronic circuit and actuates the relay 36 which opens the contact 51' and 52' in series with the holding circuit of the motor control system. This disrupts the circuit of the motor which remains open until the condition is corrected. Similarly, when the level in the bin gets too low, the capacitance between the bin wall represented as electrode 17a in Figure 3 and electrode 25 changes so as to set off the electronic circuit and open the contact of relay 29, which contacts 51 and 52 (Figure 4) are in parallel with the start button and cause the closing of the starter contacts of the motor 15, starting the motor so as to refill the bin.

It is to be understood that changes and variations may be made without departing from the spirit and scope of the invention as described in the appended claims.

I claim:

1. Apparatus for handling materials comprising a storage bin, means for withdrawing the material from the bin, means for feeding the material into the top of the bin, means for controlling the operation of the withdrawing means independently of the feeding means, an electric motor for driving the feeding means, an electric circuit for the motor, an electrode in the bin co-operating with the walls of the bin to form a capacitance, a relay with normally open contacts in parallel with the start button of the electric circuit to the motor, and an electronic circuit connecting the capacitance with the relay for closing the contacts thereof when the level in the bin falls below a predetermined point.

2. Apparatus for handling materials comprising a storage bin, means for withdrawing the material from the bin, means for feeding the material into the top of the bin, means for controlling the operation of the withdrawing means independently of the feeding means, an electric motor for driving the feeding means, an electric circuit for the motor, an electrode adjacent an upper region in the bin forming a capacitance between itself and the bin, and an electronic circuit connecting said capacitance element with a relay having normally closed contacts in series in the holding circuit of the motor starter.

3. Apparatus in accordance with claim 2 comprising a duct between the feeding means and the bin and in which the electrode is supported within one of the walls of the duct.

4. Apparatus for handling materials comprising a storage bin, means for withdrawing the material from the bin, means for feeding the material into the top of the bin, means for controlling the operation of the withdrawing means independently of the feeding means, an electric motor for driving the feeding means, an electric circuit for the motor, an electrode in the bin co-operating with the walls of the bin to form a capacitance, a relay with normally open contacts in parallel with the start button of the electric circuit to the motor, an electronic circuit connecting the capacitance with the relay for closing the contacts thereof when the level in the bin falls below a predetermined point, an additional electrode disposed adjacent an upper region in the bin forming a second capacitance element with the bin, and an electronic circuit connecting the second capacitance element to a relay having normally closed contact in series with the holding coil of the motor starter.

5. Apparatus in accordance with claim 4 comprising a duct between the feeding means and the bin and in which said additional electrode is supported within the walls of the duct.

CAMIEL DE BRABANDER.

REFERENCES CITED

The following references are of record in the file of this patent:

UNITED STATES PATENTS

| Number | Name | Date |
| --- | --- | --- |
| 2,124,018 | Vogel-Jorgensen | July 19, 1938 |
| 2,205,898 | Chandler | June 25, 1940 |
| 2,381,505 | Lindholm | Aug. 7, 1945 |